(12) United States Patent
You (10) Patent No.: US 12,352,885 B2
(45) Date of Patent: Jul. 8, 2025

(54) RADAR DEVICE

(71) Applicant: HL KLEMOVE CORP., Incheon (KR)

(72) Inventor: Kyung Jin You, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 332 days.

(21) Appl. No.: 17/827,659

(22) Filed: May 28, 2022

(65) Prior Publication Data

US 2022/0390551 A1 Dec. 8, 2022

(30) Foreign Application Priority Data

Jun. 8, 2021 (KR) .......................... 10-2021-0073876

(51) Int. Cl.
*G01S 7/03* (2006.01)
*G01S 13/00* (2006.01)

(52) U.S. Cl.
CPC .............. *G01S 7/03* (2013.01); *G01S 13/003* (2013.01)

(58) Field of Classification Search
None
See application file for complete search history.

(56) References Cited

U.S. PATENT DOCUMENTS

2022/0214423 A1\* 7/2022 Markish ................. G01S 7/352

FOREIGN PATENT DOCUMENTS

| CN | 2126233066 U | * | 2/2021 | ............ G01S 13/42 |
|---|---|---|---|---|
| KR | 10-2015-0127188 A1 | | 11/2015 | |
| KR | 10-2018-0060341 | | 6/2018 | |
| KR | 10-2018-0116325 A1 | | 10/2018 | |
| KR | 10-2020-0047411 | | 5/2020 | |
| KR | 10-2020-0086178 | | 7/2020 | |
| WO | 2014139992 A1 | | 9/2014 | |
| WO | 2017148561 A1 | | 9/2017 | |

OTHER PUBLICATIONS

Office Action issued in the corresponding Korean Patent Application No. 10-2021-0073876 dated Feb. 20, 2024 with machine translation.
Notice of Allowance dated Jul. 18, 2024 for Korean Patent Application No. 10-2021-0073876 and its English translation from Global Dossier.

\* cited by examiner

*Primary Examiner* — Vladimir Magloire
*Assistant Examiner* — Brandon James Henson
(74) *Attorney, Agent, or Firm* — WOMBLE BOND DICKINSON (US) LLP

(57) ABSTRACT

The disclosure relates to a radar device. According to the disclosure, a radar device comprises an antenna unit including a first reception antenna including at least one reception channel disposed apart from each other by a first interval and a first transmission antenna including at least one transmission channel disposed apart from each other by a second interval, a transceiver transmitting a transmission signal through the first transmission antenna and receiving a signal reflected by an object through the first reception antenna, and a controller obtaining information about the object by processing the reflected signal received through the first reception antenna.

6 Claims, 10 Drawing Sheets

RADAR DEVICE

CROSS-REFERENCE TO RELATED APPLICATION

This application claims priority from Korean Patent Application No. 10-2021-0073876, filed on Jun. 8, 2021, which is hereby incorporated by reference for all purposes as if fully set forth herein.

BACKGROUND

Field

The present embodiments relate to a radar device equipped in a vehicle.

Description of Related Art

Radar technology refers to a technology for detecting an object and obtaining information about the object using the signal received after a signal transmitted from a transmission antenna of a radar device is reflected by the object. Such radar technology is in wide use for, e.g., automobiles, aircraft, and military applications. Recently, radar technology for vehicles have more applications. In particular, small-size vehicle radars are being developed to be applicable to advanced driver assistance systems (ADASs).

Radar devices for vehicles require a high-definition angular resolution for accurate target detection. Conventional radar devices have an array of several reception antennas to acquire a high-definition angular resolution. In other words, conventional radar devices have a structure of an array of multiple reception antenna channels to raise the angular resolution. As structured to have an array of multiple reception antennas, the conventional radar device is bulky and requires many related elements in the transceiver (e.g., an RF circuit).

Multiple-input multiple-output (MIMO) radars recently developed to downsize vehicle radars increase the aperture of the reception antenna by placing a proper gap for the transmission antenna to thereby reduce the number of radio frequency (RF) chips without degrading the performance. In other words, vehicle radar devices require a decrease in size and costs as well as a high-definition angular resolution. Typically, a downsized radar device may restrict the number of antennas and lead to degradation of the angular resolution.

Accordingly, a need exists for developing a radar device with a reduced size while maintaining a high-definition angular resolution.

BRIEF SUMMARY

In the foregoing background, the disclosure provides a radar device that generates a virtual antenna to thereby increase the aperture of the reception antenna.

To achieve the foregoing objectives, according to an aspect of the disclosure, there is provided a radar device comprising an antenna unit including a first reception antenna including at least one reception channel disposed apart from each other by a first interval and a first transmission antenna including at least one transmission channel disposed apart from each other by a second interval, a transceiver transmitting a transmission signal through the first transmission antenna and receiving a signal reflected by an object through the first reception antenna, and a controller obtaining information about the object by processing the reflected signal received through the first reception antenna.

As described above, according to the disclosure, there may be provided a radar device with a reduced size and enhanced angular resolution by increasing the aperture of the reception antenna through arrangement of the transmission antenna and the reception antenna.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

As used herein, "first direction" means a direction perpendicular to the ground, and "second direction" means a direction parallel to the ground and perpendicular to the first direction. As used herein, "channel" means array antennas supplied power through a single feeding line. As used herein, "information about an object" means, e.g., position information or speed information about an object detected in the detection area of the radar device.

A radar device 10 according to an embodiment of the disclosure is described below with reference to the accompanying drawings.

Figure 1:
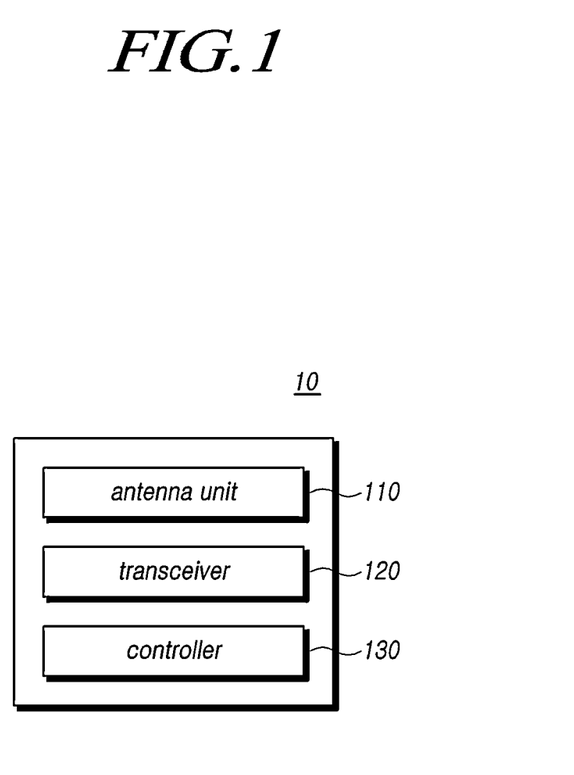
FIG. 1 is a block diagram illustrating a radar device according to an embodiment of the disclosure.

FIG. 1 is a block diagram illustrating a radar device 10 according to an embodiment of the disclosure.

The radar device 10 according to an embodiment of the disclosure may include an antenna unit 110, a transceiver 120, and a controller 130.

The radar device 10 may be mounted in various positions, e.g., the front, rear, or side of the vehicle.

Figure 2:
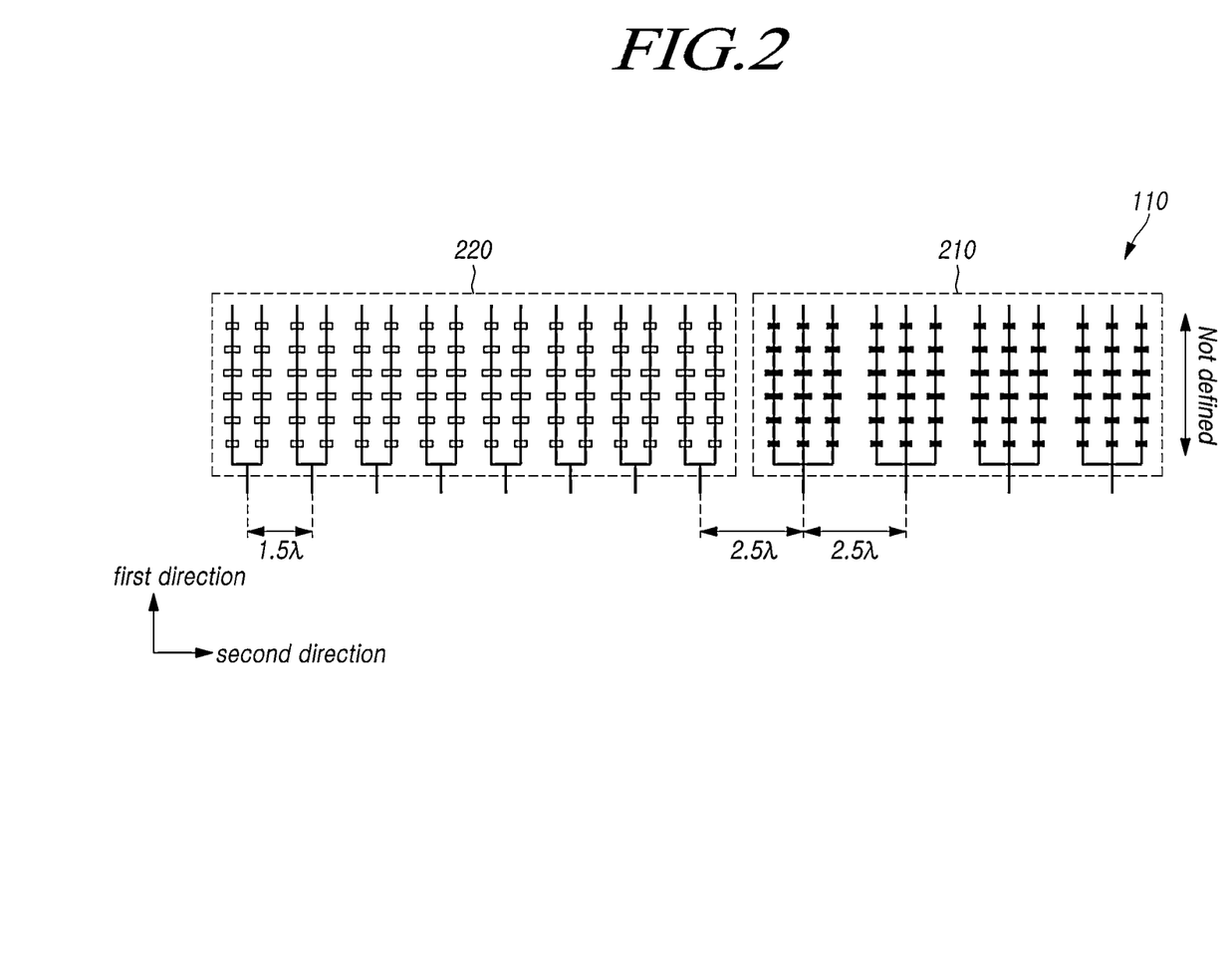
FIG. 2 is a view illustrating an antenna array according to an embodiment.

FIG. 2 is a view illustrating an antenna array according to an embodiment.

Referring to FIG. 2, the antenna unit 110 may include a first reception antenna 220 including at least one reception channel which is disposed at a first interval and a first transmission antenna 210 including at least one transmission channel which is disposed at a second interval.

Each of the transmission antenna and the reception antenna may include at least one or more patch antenna. To properly suppress the directivity of the antenna signal for the vertical direction, an array antenna may be used in which two or more patch antennas are connected to each other in a first direction which is perpendicular to the ground. However, this is merely an example, and embodiments of the disclosure are not limited thereto. The number, size, and shape of the patch antennas included in each array antenna may be changed as needed.

To properly suppress the directivity of the antenna signal for the horizontal direction, the reception antenna or transmission antenna included in the antenna unit 110 may have two or more array antennas disposed horizontal to the ground at the same interval. In this case, the array antennas supplied power through a single feeding line are regarded as connected to the same channel.

Referring to FIG. 2, for example, two array antennas may constitute the first reception antenna 220 through one channel, and three array antennas may constitute the first transmission antenna 210 through one channel.

To enhance the horizontal angular resolution, it is required to place the left end and right end of the reception antenna in all the channels as far from each other as possible. To that end, it is needed to increase the number of channels of the reception antenna or to sufficiently broaden the interval between the array antennas. However, since the directivity of the signal may be damaged if the inter-array antenna interval is larger than half ($\lambda/2$) the wavelength used, it is required to efficiently adjust the number of channels and the number of array antennas and the inter-array antenna interval.

As shown in FIG. 2, the first reception antenna 220 may include eight reception channels arranged in the second direction, and the first transmission antenna 210 may include four transmission channels arranged in the second direction. The first reception antenna 220 may be disposed in parallel to the first transmission antenna 210 and be disposed apart from the first transmission antenna 210 by the second interval.

The first interval in the first reception antenna 220 may be set so that the difference in absolute value from the second interval is 0.5 wavelengths or more and 1 wavelength or less. The first interval and the second interval each may be set to 1 wavelength or more.

For example, the first interval may be set to 1.5 wavelength ($\lambda$), and the second interval may be set to 2.5 wavelength.

Figure 3:
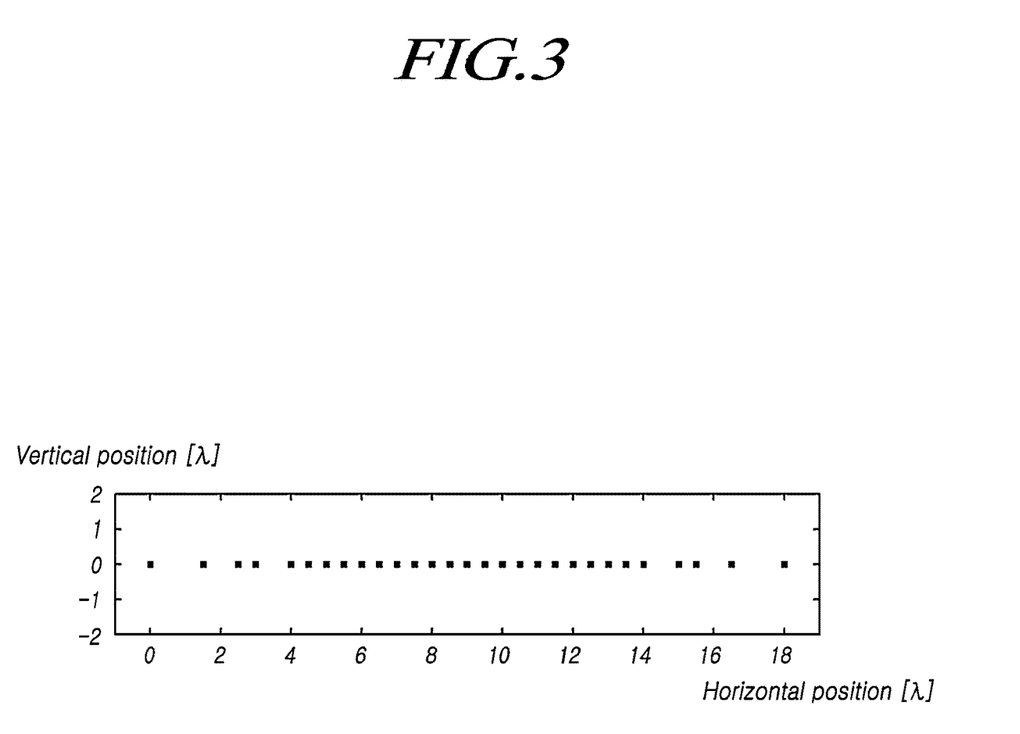
FIG. 3 is a view illustrating an example in which the antenna array of FIG. 2 is generated as a virtual antenna through a MIMO system according to an embodiment.

FIG. 3 is a view illustrating an example in which the antenna array of FIG. 2 is generated as a virtual antenna through a MIMO system according to an embodiment.

Referring to FIG. 3, the above-described arrangement of the first reception antenna 220 and the first transmission antenna 210 may be generated as a virtual antenna of FIG. 3 through a multiple input multiple output (MIMO) system.

Accordingly, the virtual antenna may be configured such that the interval in the central portion is half wavelength (0.5$\lambda$) and the length of the aperture is 18 wavelength. Objects within the detection range of the antenna may be detected in the entire aperture length, as well as the central portion having the half-wavelength interval. As an example, the length of the central portion of FIG. 3 may be 10 wavelength.

Figure 4:
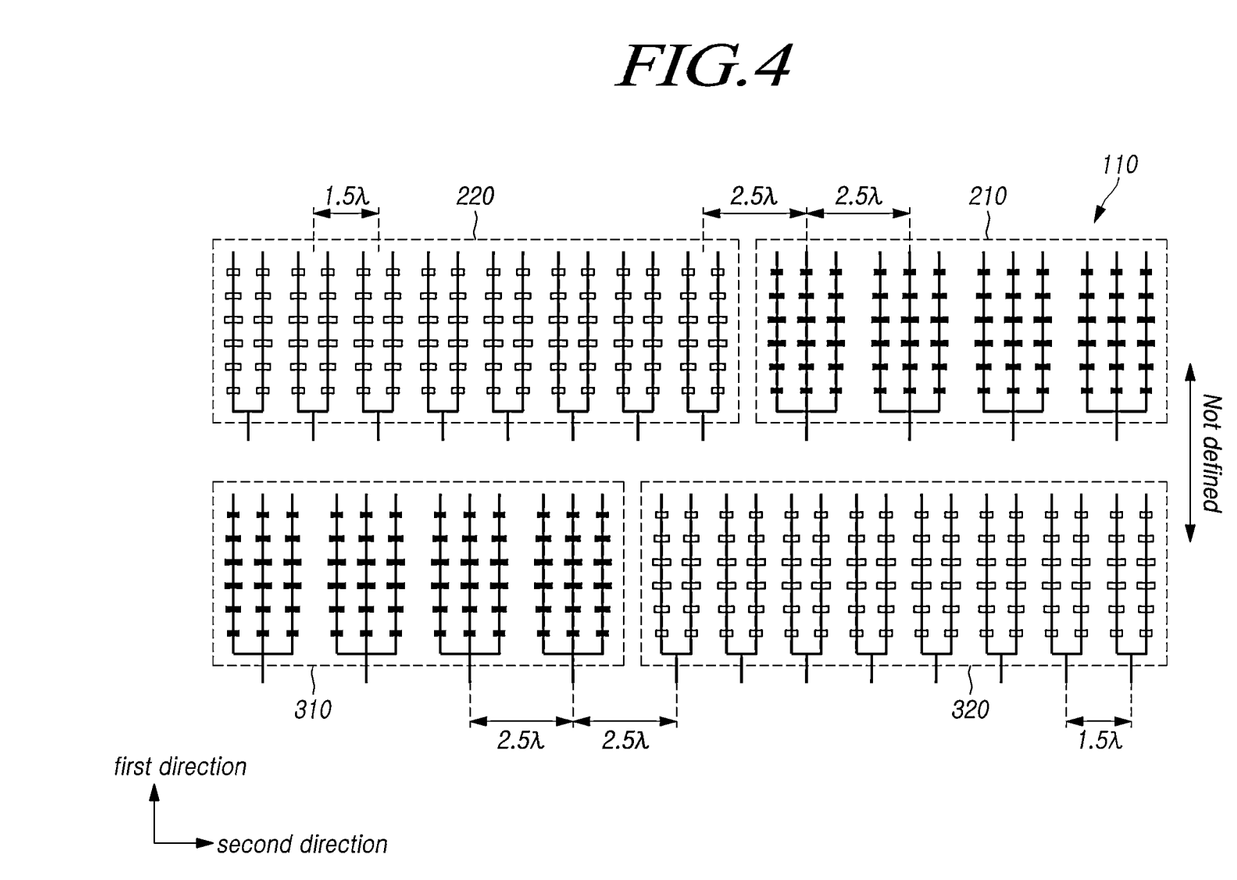
FIG. 4 is a view illustrating an antenna array according to an embodiment.

FIG. 4 is a view illustrating an antenna array according to an embodiment.

Referring to FIG. 4, the antenna unit 110 may further include a second transmission antenna 310 disposed under the first reception antenna 220 and including a plurality of transmission channels and a second reception antenna 320 disposed under the first transmission antenna 210 and including a plurality of reception channels.

Here, the term "under" may mean under in the first direction. In other words, as shown in FIG. 4, the first reception antenna 220 and the second transmission antenna 310 may be spaced apart from each other in the first direction. Likewise, the first transmission antenna 210 and the second reception antenna 320 may be spaced apart from each other in the first direction.

The second reception antenna 320 may be disposed in parallel to the second transmission antenna 310 and be disposed apart from the second transmission antenna 310 by the second interval. In other words, the second reception antenna 320 may be spaced apart from the second transmission antenna 310 in the second direction.

Further, the interval in the first direction between the first reception antenna 220 and the second transmission antenna 310 may be varied depending on the arrangement of monolithic microwave integrated circuits (MMICs) and may be varied depending on the purpose of the antenna.

Figure 5:
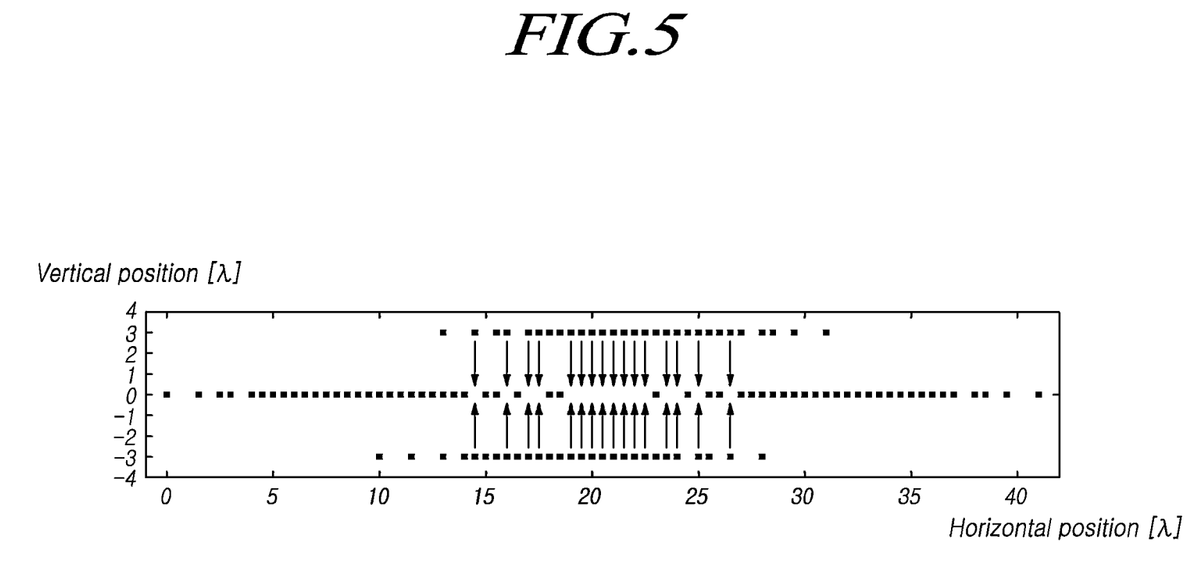
FIGS. 5 and 6 are views illustrating an example in which the antenna array of FIG. 4 is generated as a virtual antenna through a MIMO system according to an embodiment.
Figure 6:
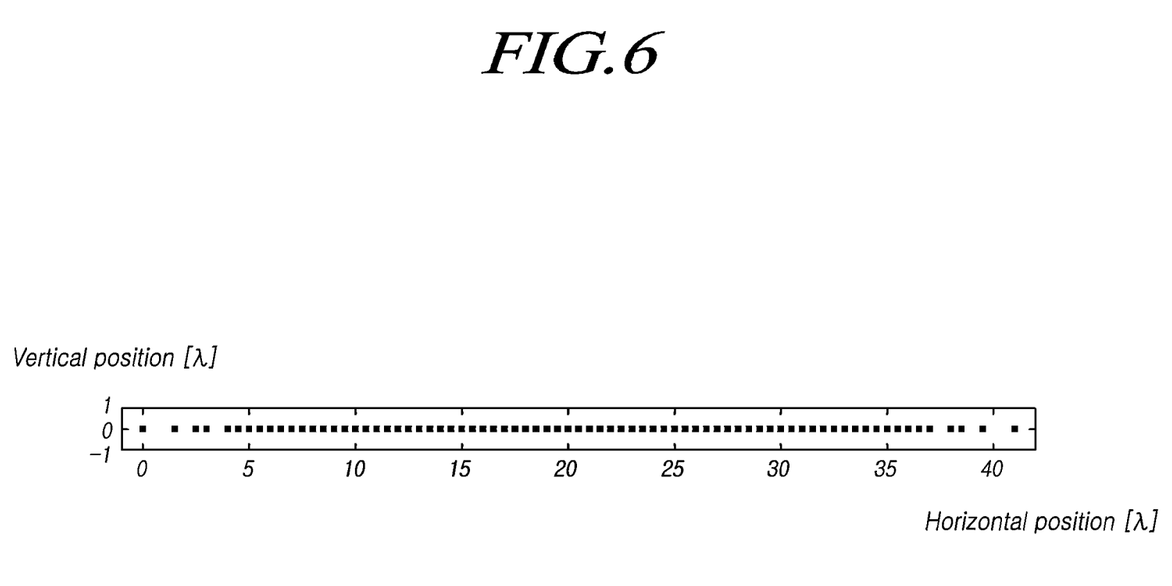

FIGS. 5 and 6 are views illustrating an example in which the antenna array of FIG. 4 is generated as a virtual antenna through a MIMO system according to an embodiment.

Referring to FIG. 5, it may be identified that a phase difference occurs between virtual antennas due to the antenna array of FIG. 4. A virtual antenna may be generated in the position where the vertical phase information (vertical position) is 0 as shown in FIG. 6 by averaging the respective phases of the virtual antennas and replacing it with a virtual antenna.

Referring to FIG. 6, the virtual antenna generated as described above may be configured with a 41-wavelength aperture and a half-wavelength interval. As an example, the length of the central portion of FIG. 6 may be 33 wavelength.

Figure 7:
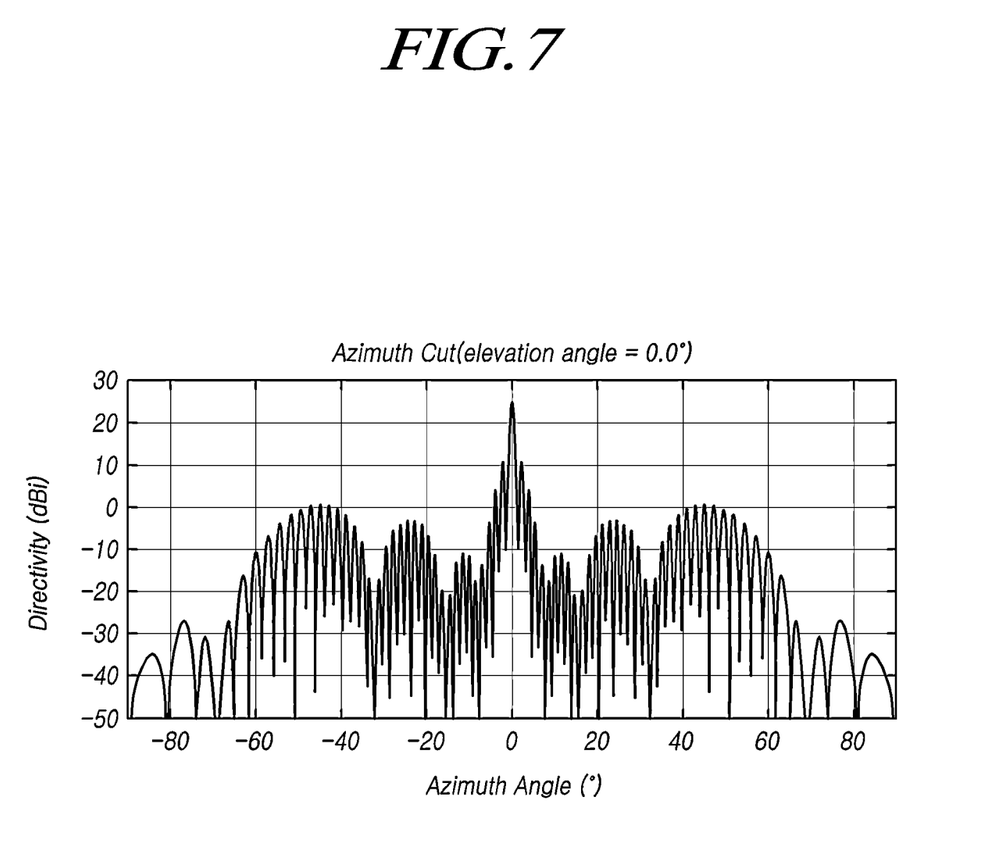
FIG. 7 is a view illustrating a beam pattern of a virtual antenna according to an embodiment.

FIG. 7 is a view illustrating a beam pattern of a virtual antenna according to an embodiment.

Referring to FIG. 7, the virtual antenna generated as described above is capable of high-definition angular resolution as shown in FIG. 7. Further, the half power beam width (HPBW) of the generated virtual antenna may be about −0.7 deg to +0.7 deg.

Here, the first interval may be set to 1.5 wavelength, and the second interval may be set to 2.5 wavelength.

Figure 8:
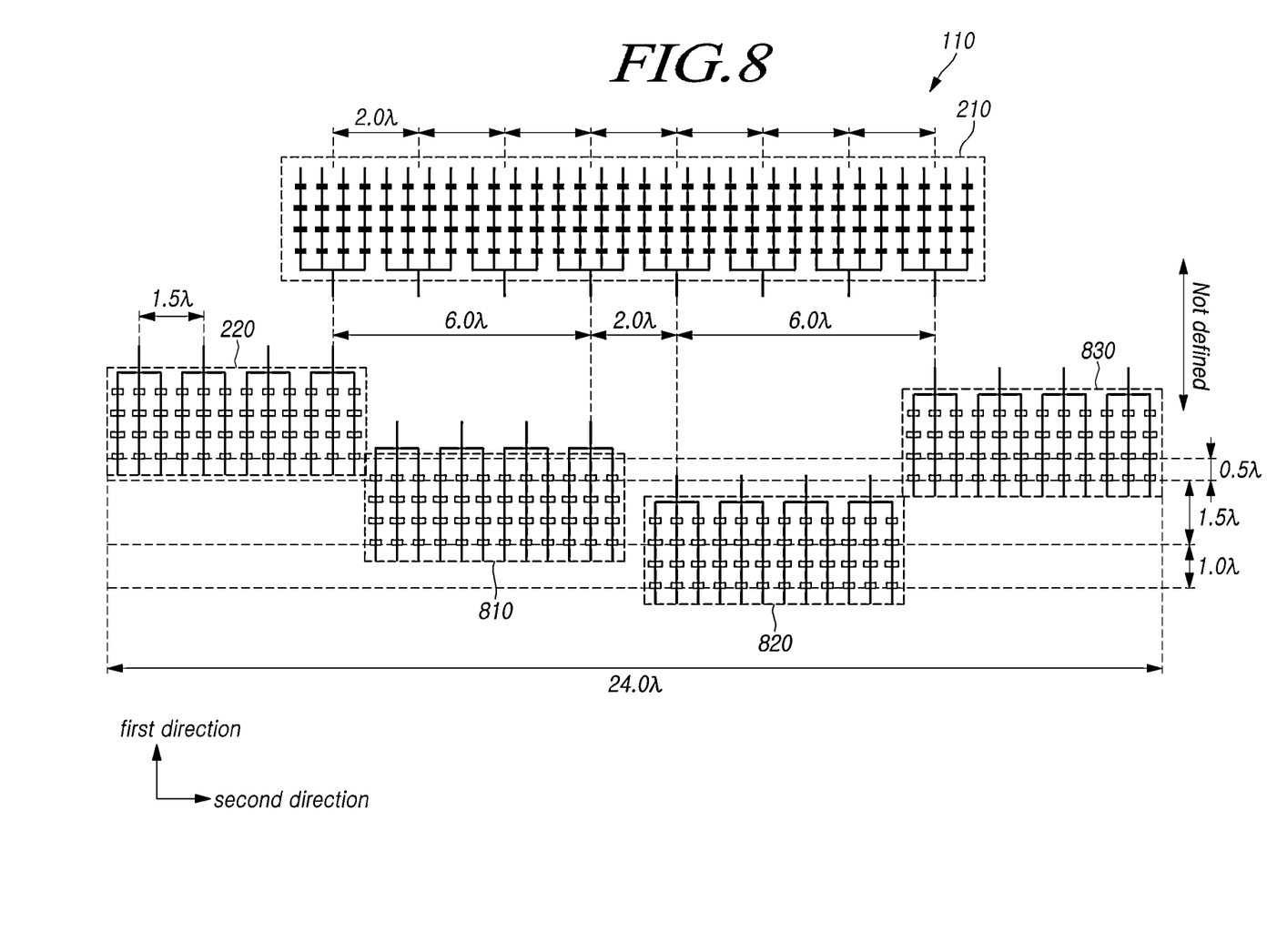
FIG. 8 is a view illustrating an antenna array according to an embodiment.

FIG. 8 is a view illustrating an antenna array according to an embodiment.

Referring to FIG. 8, the antenna unit 110 may further include a third reception antenna spaced apart from the first transmission antenna 210 by a third interval in the first direction and including at least one reception channel disposed apart from each other by the second interval, a fourth reception antenna 820 spaced apart from the third reception antenna 810 by a fourth interval in the first direction and including at least one reception channel disposed apart from each other by the second interval, and a fifth reception antenna 830 spaced apart from the fourth reception antenna 820 by a third interval in the first direction and including at least one reception channel disposed apart from each other by the second interval.

As an example, referring to FIG. 8, four array antennas may constitute the first transmission antenna 210 through one channel, and three array antennas may constitute each of the first reception antenna 220, the third reception antenna 810, the fourth reception antenna 820, and the fifth reception antenna 830, through one channel. The first transmission antenna 210 may include eight channels, and each of the first reception antenna 220, the third reception antenna 810, the fourth reception antenna 820, and the fifth reception antenna 830 may include four channels. Here, each channel may be disposed in the second direction.

Further, the first reception antenna 220, the third reception antenna 810, the fourth reception antenna 820, and the fifth reception antenna 830 may be disposed under the first transmission antenna 210.

Further, the third reception antenna 810 may be spaced apart by the third interval from the rightmost reception channel among the reception channels included in the first reception antenna 220 to the rightmost reception channel among the reception channels included in the third reception antenna 810.

Further, the fifth reception antenna 830 may be spaced apart by the third interval from the leftmost reception channel among the reception channels included in the fourth reception antenna 820 to the leftmost reception channel among the reception channels included in the fifth reception antenna 830.

Further, the fifth reception antenna 830 may be spaced apart by a fourth interval from the lower end of the first reception antenna 220. Here, the fourth interval may be set to 0.5 wavelength. The third reception antenna 810 may be spaced apart from the lower end of the fifth reception antenna 830 by a fifth interval, and the fifth interval may be set to 1.5 wavelength. The fourth reception antenna 820 may be spaced apart from the lower end of the third reception antenna 810 by a sixth interval, and the sixth interval may be set to 1 wavelength.

According to the antenna array of FIG. 8, the first interval may be set to 2 wavelength, the second interval to 1.5 wavelength, and the third interval to 6 wavelength.

The interval in the first direction between the first transmission antenna 210 and the first reception antenna 220 may be varied depending on the arrangement of an MMIC and may be varied depending on the purpose of the antenna.

Figure 9:
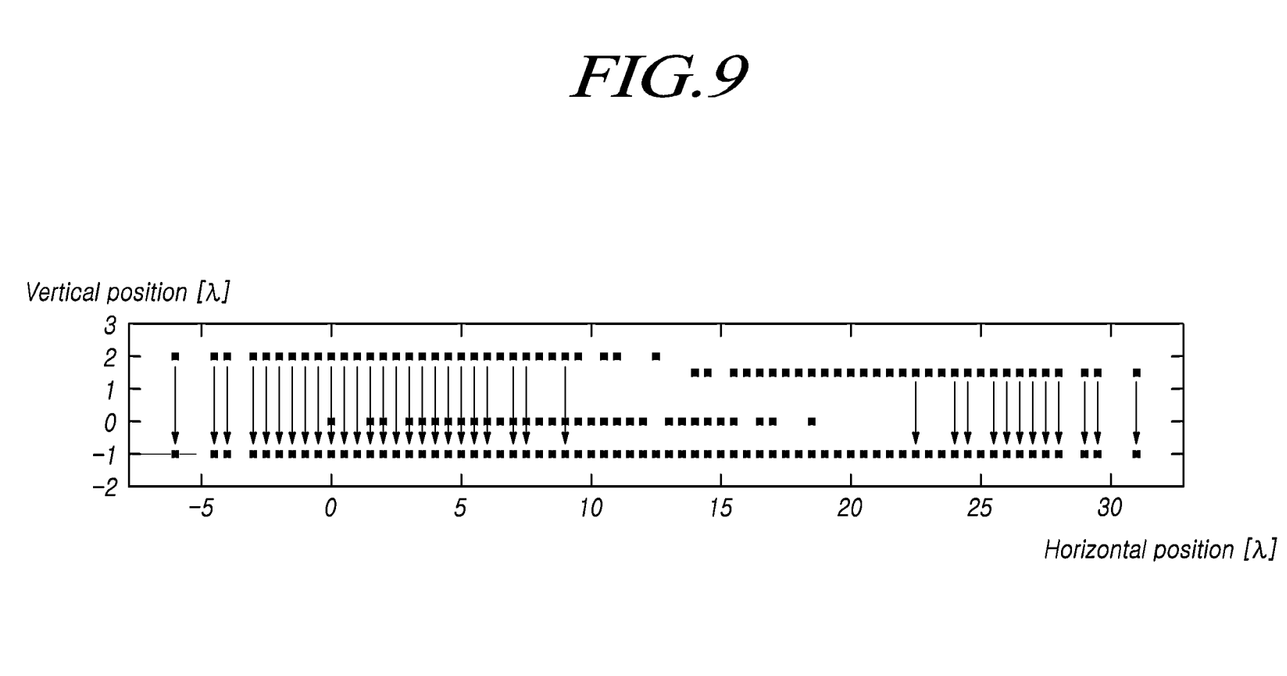
FIG. 9 is a view illustrating an example in which the antenna array of FIG. 8 is generated as a virtual antenna through a MIMO system according to an embodiment.

FIG. 9 is a view illustrating an example in which the antenna array of FIG. 8 is generated as a virtual antenna through a MIMO system according to an embodiment.

Referring to FIG. 9, the virtual antenna according to the antenna array of FIG. 8 may be generated as shown in FIG. 9, and a final virtual antenna may be generated through vertical correction. Specifically, the antenna array according to FIG. 8 generates virtual antennas having four vertical deviations, and the final virtual antenna may be generated by correcting the phases of the other virtual antennas than the virtual antenna in the position of the lowest vertical phase information with respect to the virtual antenna in the position of the lowest vertical phase information.

In this case, the azimuth and vertical angle may be calculated as shown in Table 1. The angles may be varied depending on the configuration and arrangement of the antennas.

TABLE 1

|  | −3dB | −6dB | −10dB |
| --- | --- | --- | --- |
| Azimuth beam width (deg.) | 1.4 | 2.0 | 2.4 |
| Elevation beam width (deg.) | 13.2 | 18.2 | 22.6 |

The radar device 10 may include a transceiver 120 that transmits transmission signals through a transmission antenna and receives the signal reflected by an object through a reception antenna.

According to an example, the transmission unit included in the transceiver 120 may include an oscillator that generates transmission signals for one transmission channel assigned to a transmission antenna or multiple transmission channels assigned to a plurality of transmission antennas. The oscillation unit may include, e.g., a voltage-controlled oscillator (VCO) and an oscillator.

According to an example, the reception unit included in the transceiver 120 may include, e.g., a low noise amplifier (LNA) that low-noise amplifies the reflected signal, which is received through a reception antenna (i.e., a plurality of reception channels), a mixer that mixes the low-noise amplified reception signal, an amplifier that amplifies the mixed reception signal, and an analog-digital converter (ADC) that converts the amplified reception signal into a digital signal to thereby generate reception data.

The controller 130 may obtain information about the object in the detection area by processing the reflected signal received through the reception antenna. For example, the controller 130 may detect a signal for the target object through correlation analysis for the reflected signal received through the reception antenna and the transmission signal transmitted through the transmission antenna.

The controller 130 may obtain information about the object, e.g., location information, by processing the transmission signal and the received reflected signal. Specifically, the controller 130 may obtain horizontal information, e.g., azimuth angle, of the object within the detection range using the transmission signal transmitted through a single first transmission antenna 210 and the reception signal received through a first reception antenna 220.

Figure 10:
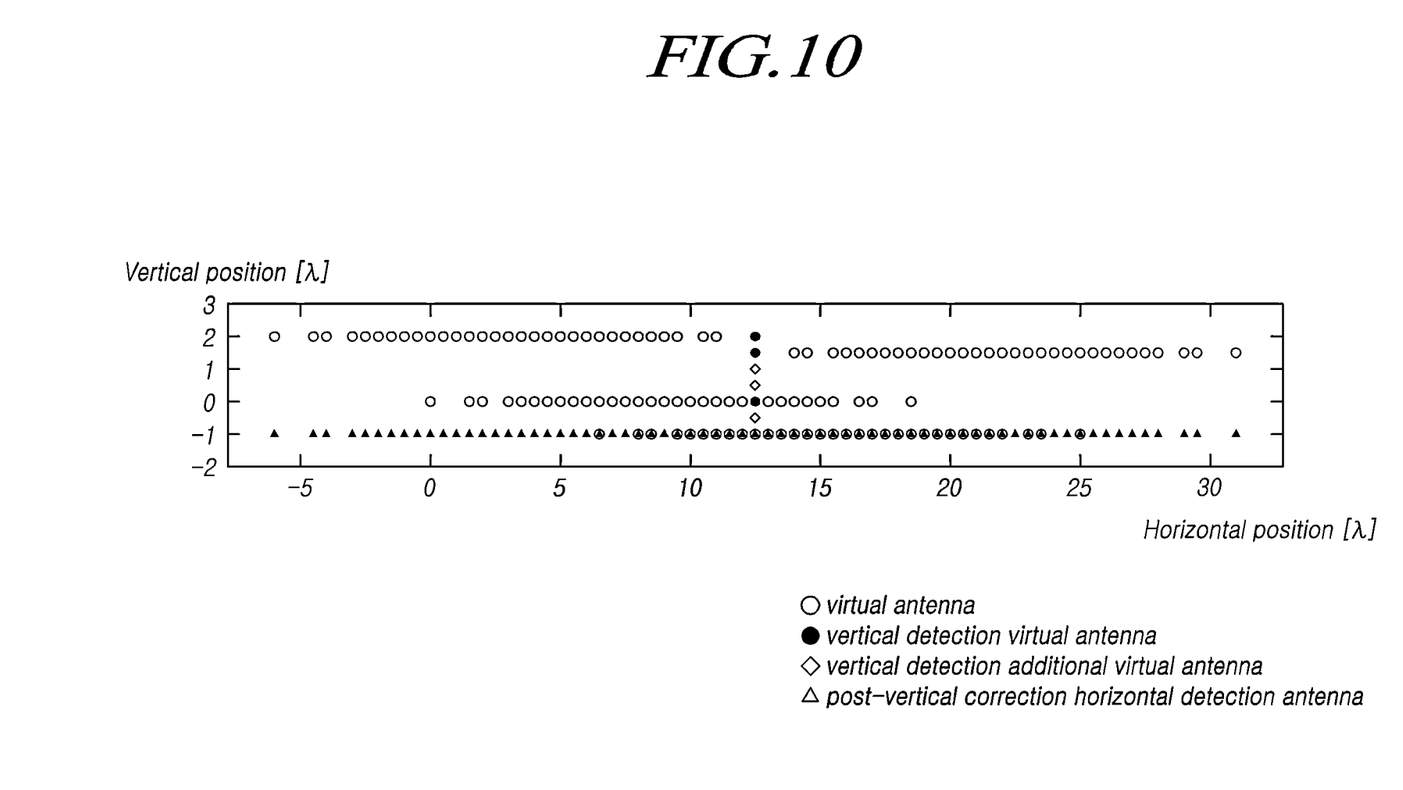
FIG. 10 is a view illustrating an example of implementing vertical detection in a virtual antenna generated based on the antenna array of FIG. 8 according to an embodiment.

FIG. 10 is a view illustrating an example of implementing vertical detection in a virtual antenna generated based on the antenna array of FIG. 8 according to an embodiment.

As described above, referring to FIG. 10, if the first transmission antenna, the first reception antenna 220, the third reception antenna 810, the fourth reception antenna 820, and the fifth reception antenna 830 are spaced apart from each other in the first direction in the antenna array of FIG. 8, the controller 130 may further obtain vertical information, such as the elevation angle of the object.

The controller 130 may obtain the vertical information based on the vertical phase information about the virtual antenna generated in each reception antenna obtained in FIG. 9. More specifically, as shown in FIG. 10, a vertical detection additional virtual antenna may be generated per interval by calculating the interval between the vertical phase information about the virtual antenna generated based on the first reception antenna 220 and the vertical phase information about the virtual antenna generated based on the fifth reception antenna 830, and the controller 130 may further obtain vertical information, such as the elevation angle of the object, through the virtual antenna for each interval.

As described above, the radar device 10 may obtain vertical information about an object by generating a vertical detection virtual antenna through the vertical deviation between the virtual antennas.

According to an example, the controller 130 may be implemented to efficiently distribute signal processing requiring significant computational load to a first processor and a second processor, thereby saving costs and reducing hardware size.

The first processor included in the controller 130 may be a pre-processor and may obtain transmission data and reception data, control the oscillator to generate a transmission signal based on the obtained transmission data, synchronize the transmission data and the reception data, and frequency-transform the transmission data and the reception data.

The first processor may data-buffer the obtained transmission data and the obtained reception data into unit sample sizes processable per period and then perform frequency transform. As the frequency transform performed by the first processor, a Fourier transform, such as a fast Fourier transform (FFT), may be used.

The second processor may be a post-processor that performs substantial processing using the result of processing by the first processor and may perform constant false alarm rate (CFAR) computation, tracking computation, and target selection computation on the object based on the reception data frequency-transformed by the first processor and extract, e.g., angle information, speed information, and distance information about the object.

The second processor may perform a second Fourier transform on the signal first Fourier transformed (FFT) by the first processor, and the second Fourier transform may be, e.g., a discrete Fourier transform (hereinafter, referred to as "DFT"). The second Fourier transform may be the chirp-DFT among the DFTs.

The second processor may obtain a number of frequency values corresponding to the second Fourier transform length through the second Fourier transform, such as chirp-DFT, calculate the bit frequency having the largest power during each chirp period based on the obtained frequency values, and obtain speed information and distance information about the object based on the calculated bit frequency, thereby detecting the object.

The radar device 10 may transmit/receive data to/from a driver assistance system (ADAS) provided to the vehicle. The controller 130 may provide information about the object to the driver assistance system (ADAS) included in the vehicle having the radar device 10.

The driver assistance system may include at least one system selected from the group consisting of an autonomous driving system, a semi-autonomous driving system, an automated parking system, a blind spot detection system, a cross traffic alert system, a lane change and merge aid system, an automatic emergency braking system, a pedestrian detection system, and a turn assist and intersection collision mitigation system. The terms and names of the driver assistance systems described herein are provided by way of example and are not limited thereto.

Upon receiving a request for sensing data by the radar device 10, the controller 130 may drive the radar device 10 and control the radar device 10 to transmit a transmission signal and receive the signal reflected from the object. The controller 130 may obtain information about the object based on the received reflected signal and transmit the obtained information about the object to the driver assistance system that has requested the sensing data.

According to an example, the driver assistance system may further use the image data captured by a camera equipped in the vehicle. In this case, the captured image data may be fused with the sensing data detected by the radar device 10 and be used.

According to an example, the controller 130 may be integrated into a domain control unit (DCU) performing the overall control on the vehicle. In this case, the controller 130 may be omitted from the radar device 10 or may be operated under the control of the domain control unit. The domain control unit may be operated to obtain information about the object by processing the received reflected signal and control one or more of the driver assistance systems based on the obtained information.

Further, the driver assistance system may also include an autonomous driving module for autonomous driving. The domain control unit may control the vehicle to perform autonomous driving by controlling the individual system modules included in the driver assistance system.

Accordingly, it is possible to provide the driver of the vehicle with convenience and safety by providing the information about the object detected by the radar device 10 to the driver assistance system provided in the vehicle.

As described above, according to the disclosure, there may be provided a radar device 10 with a reduced size and enhanced angular resolution by increasing the aperture of the reception antenna through arrangement of the transmission antenna and the reception antenna.

The above description has been presented to enable any person skilled in the art to make and use the technical idea of the present disclosure, and has been provided in the context of a particular application and its requirements.

Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar device, comprising:
an antenna unit including:
a first reception antenna including reception channels disposed apart from each other by a first interval in a first direction parallel to a ground,
a first transmission antenna including transmission channels disposed apart from each other by a second interval different from the first interval in the first direction parallel to the ground,
a second transmission antenna spaced apart from the first reception antenna in a second direction, perpendicular to the ground, and including a plurality of transmission channels disposed apart from each other by the second interval in the first direction parallel to the ground, and
a second reception antenna spaced apart from the first transmission antenna in the second direction, perpendicular to the ground, and including a plurality of reception channels disposed apart from each other by the first interval in the first direction parallel to the ground;
a transceiver transmitting a transmission signal through the first transmission antenna and receiving a signal reflected by an object through the first reception antenna; and
a controller obtaining information about the object by processing the reflected signal received through the first reception antenna,
wherein the first transmission antenna is located next to the first reception antenna in the first direction parallel to the ground, the second transmission antenna is located directly below the first reception antenna in the second direction perpendicular to the ground, and the second reception antenna is located directly below the first transmission antenna in the second direction perpendicular to the ground and next to the second transmission antenna in the first direction parallel to the ground, and
wherein each channel of the reception channels or the transmission channels is defined as at least one array antenna supplied power through a single feeding line.

2. The radar device of claim 1, wherein the first reception antenna includes eight reception channels disposed in the first direction, and the first transmission antenna includes four transmission channels disposed in the first direction.

3. The radar device of claim 1, wherein the first reception antenna is spaced apart from the first transmission antenna by the second interval in the first direction parallel to the ground.

4. The radar device of claim 1, wherein the second reception antenna is spaced apart from the second transmission antenna by the second interval in the first direction parallel to the ground.

5. The radar device of claim 1, wherein the first interval is set so that a difference in absolute value from the second interval is 0.5 wavelength of a transmission signal of the radar device or more and 1 wavelength or less of the transmission signal of the radar device.

6. The radar device of claim 1, wherein the first interval and the second interval each are set to 1 wavelength or more of a transmission signal of the radar device.

* * * * *